United States Patent
Gelbart

(12) 
(10) Patent No.: US 6,268,948 B1
(45) Date of Patent: Jul. 31, 2001

(54) MICROMACHINED REFLECTIVE LIGHT VALVE

(75) Inventor: Daniel Gelbart, Vancouver (CA)

(73) Assignee: Creo Products Inc., Burnaby (CA)

( * ) Notice: Subject to any disclaimer, the term of this patent is extended or adjusted under 35 U.S.C. 154(b) by 0 days.

(21) Appl. No.: 09/337,204

(22) Filed: Jun. 11, 1999

(51) Int. Cl.$^7$ ................................ G02B 26/02; B41J 2/47
(52) U.S. Cl. ..................... 359/231; 359/291; 359/295; 359/900; 347/135; 347/255
(58) Field of Search ................... 359/223, 224, 359/290, 291, 292, 295, 846, 900, 230, 231; 347/239, 259, 135, 136, 255

(56) References Cited

U.S. PATENT DOCUMENTS

| | | | |
|---|---|---|---|
| Re. 16,767 | * 10/1927 | Jenkins | 359/291 |
| 3,001,447 | * 9/1961 | Ploke | 359/292 |
| 4,001,635 | * 1/1977 | D'Auria et al. | 359/291 |
| 4,035,061 | * 7/1977 | Sheridon | 359/295 |
| 4,074,253 | * 2/1978 | Nadir | 345/108 |
| 4,571,603 | * 2/1986 | Hornbeck et al. | 347/239 |
| 5,325,116 | * 6/1994 | Sampsell | 346/108 |
| 5,450,231 | * 9/1995 | Battig et al. | 359/290 |
| 5,508,840 | * 4/1996 | Vogel et al. | 359/291 |
| 5,661,592 | * 8/1997 | Bornstein et al. | 359/291 |
| 5,691,836 | * 11/1997 | Clark | 359/291 |
| 5,822,110 | * 10/1998 | Dabbaj | 359/293 |
| 6,094,294 | * 7/2000 | Yokoyama et al. | 359/290 |

FOREIGN PATENT DOCUMENTS

| | | | |
|---|---|---|---|
| 1128175 | * 4/1962 | (DE) | 359/291 |
| 1269475 | * 7/1961 | (FR) | 359/291 |
| 0201202 | * 10/1985 | (JP) | 359/291 |
| 0046475 | * 10/1916 | (SE) | 359/224 |
| WO97/31283 | * 8/1997 | (WO) . | |

OTHER PUBLICATIONS

Raji Krishnamoorthy Mali, et al., "Development of Micro-electromechanical Deformable Mirrors for Phase Modulation of Light", Optical Eng., vol. 36, No. 2, pp. 542–548, Feb. 1977.*

* cited by examiner

Primary Examiner—Thong Nguyen
Assistant Examiner—John Juba, Jr.
(74) Attorney, Agent, or Firm—Oyen Wiggs Green & Mutala

(57) ABSTRACT

A light valve which can be fabricated as an array of individually addressable micromachined linear mirror reflective light valves is disclosed. Each light valve may comprise a metallized silicon nitride ribbon situated above a micromachined cavity. Incident light is reflected by the ribbons. The reflected beam travels into an optical collecting system. The ribbons may be caused to deform into the micromachined cavities by the application of electrical signals. Only a small area on the ribbons is required to be reflective. The deformation causes light reflected by the deformed ribbon to be substantially collimated. The collimated reflected light can be directed through a slit and focussed on a spot to record a data element on a recording surface. A light valve array according to the invention may be used for various data recording applications including exposing printing plates, printed circuit boards, silicon wafers, masks for making semiconductor devices, optical data storage systems and the like.

27 Claims, 4 Drawing Sheets

MICROMACHINED REFLECTIVE LIGHT VALVE

RELATED INVENTIONS

The invention herein disclosed is related to co-owned, U.S. patent application Ser. No. 09/072,753, now U.S. Pat. No. 6,147,789.

FIELD OF THE INVENTION

The invention relates to the modulation of light beams and particularly to the modulation of light beams employing reflective light valves with micromachined deformable mirrors.

BACKGROUND OF THE INVENTION

In the prior art, micromachined ribbons have been used for various types of optical systems. A primary use for such ribbons is a phased-array mirror, wherein many ribbons act in unison as one large mirror. The deformable ribbons adjust the surface of the mirror so as to change the shape of the wave front. The manner in which phased-array mirrors act in unison to change the shape of the wave front represents a different concept than light valves in which individual ribbons are addressable, so as to permit modulation of individual "sub-beams" of light.

Micromachined ribbons have also been used in interferometric light valves, the operation of which depend on the wave nature of light. Such an interferometric scheme is disclosed in U.S. Pat. No. 5,508,840, wherein each light valve comprises two ribbons and the modulation technique involves deforming the ribbons in a manner that causes the light to interfere constructively or destructively. Depending on the deformation of the two ribbons, the constructive and destructive interference cause differences in the light intensity at a given location. A second type of interferometric light valve employing micromachined ribbons is known in the art as a grating light valve. In a grating light valve, a group of ribbons form a diffraction grating which causes diffraction spots to occur in various locations. Once again, the difference in the light intensity between constructively and destructively interfering light waves form high and low intensity diffraction spots which allow for modulation of data. In general, interferometric light valves require more than one micromachined optical element per channel, and can operate only at a narrow range of wavelength since the motion of the ribbon has to correspond to a known fraction (typically one quarter or one half) of a wavelength.

An additional drawback of the diffraction grating light valves is low optical efficiency. The zero order beam is not suitable for digital recording because the contrast ratio is poor (i.e. the difference between the bright spots caused by constructive interference and the dark spots caused by destructive interference is insufficient to record the digital data faithfully). The alternative, the first order diffraction spot, contains less than 50% of an incident beam's light energy, representing a low optical efficiency. In order to reduce the loss of light incurred by using the first order beam, a technique known as "blazing" has been developed. Blazing incorporates multiple ribbons aligned in a "staircase" fashion. Although blazing increases the optical efficiency of the first order spot, it effectively recreates the aforementioned disadvantage of requiring a plurality of optical elements for each individual light valve.

The related U.S. patent application Ser. No. 09/072,753, employs a micromachined ribbon which reflects incident light. On the selective application of an electrostatic field, the ribbon deforms into a cylindrical shape focusing the reflected light through a collection slit. In contrast to the interferometric devices mentioned above, the invention of application Ser. No. 09/072,753 uses the geometric properties of light rays as a basis for modulation. When the ribbon is flat (i.e. in the absence of an electrostatic field), the reflected light is scattered broadly and only a small fraction makes it through the collection slit. In contrast, when the ribbon forms a cylindrical mirror, the reflected light converges on the slit and a relatively high intensity spot is formed.

The application Ser. No. 09/072,753, has several shortcomings, the main one being that the performance is dependent on the shape of the deformed ribbon. When the ribbon is perfectly cylindrical, the focal point can be accurately predicted and the collection slit can be appropriately positioned. However, in the working device, the deforming ribbons do not form perfect cylindrical surfaces and, consequently, a portion of the incident light energy is lost. Additionally, the application Ser. No. 09/072,753 process uses the entire surface of the ribbon to reflect light. As a result, the device is sensitive to small variations and processing imperfections on the reflective surface of the ribbon. Small imperfections can cause light to reflect in random directions so that some of the reflected light does not reach the collection slit and is lost. Furthermore, because of the micromachine processing, an array of ribbons must have small gaps between each pair of ribbons to permit the etching of the cavity behind the ribbons. Naturally, these gaps must be of a certain width to properly etch the cavity. When light incident on the ribbon array impinges on one of the gaps, then that portion of the incident light is not reflected and does not contribute to the modulation process. These disadvantages all represent losses of optical efficiency and reduced contrast ratios.

SUMMARY OF THE INVENTION

It is an object of the present invention to form a light valve based on reflective deformable micromachined ribbons requiring only one ribbon per device.

Another object of the present invention is to create a light valve which has an improved contrast and optical efficiency over prior-art micromachined light valves.

A further object of the present invention is to create a light valve which uses only a fraction of the surface of the micromachined ribbon while maintaining high optical efficiency, such that the device is relatively insensitive to the shape of the deformed ribbon or minor processing defects in the profile of the reflective surface.

DESCRIPTION OF THE PREFERRED EMBODIMENT

Figure 1:
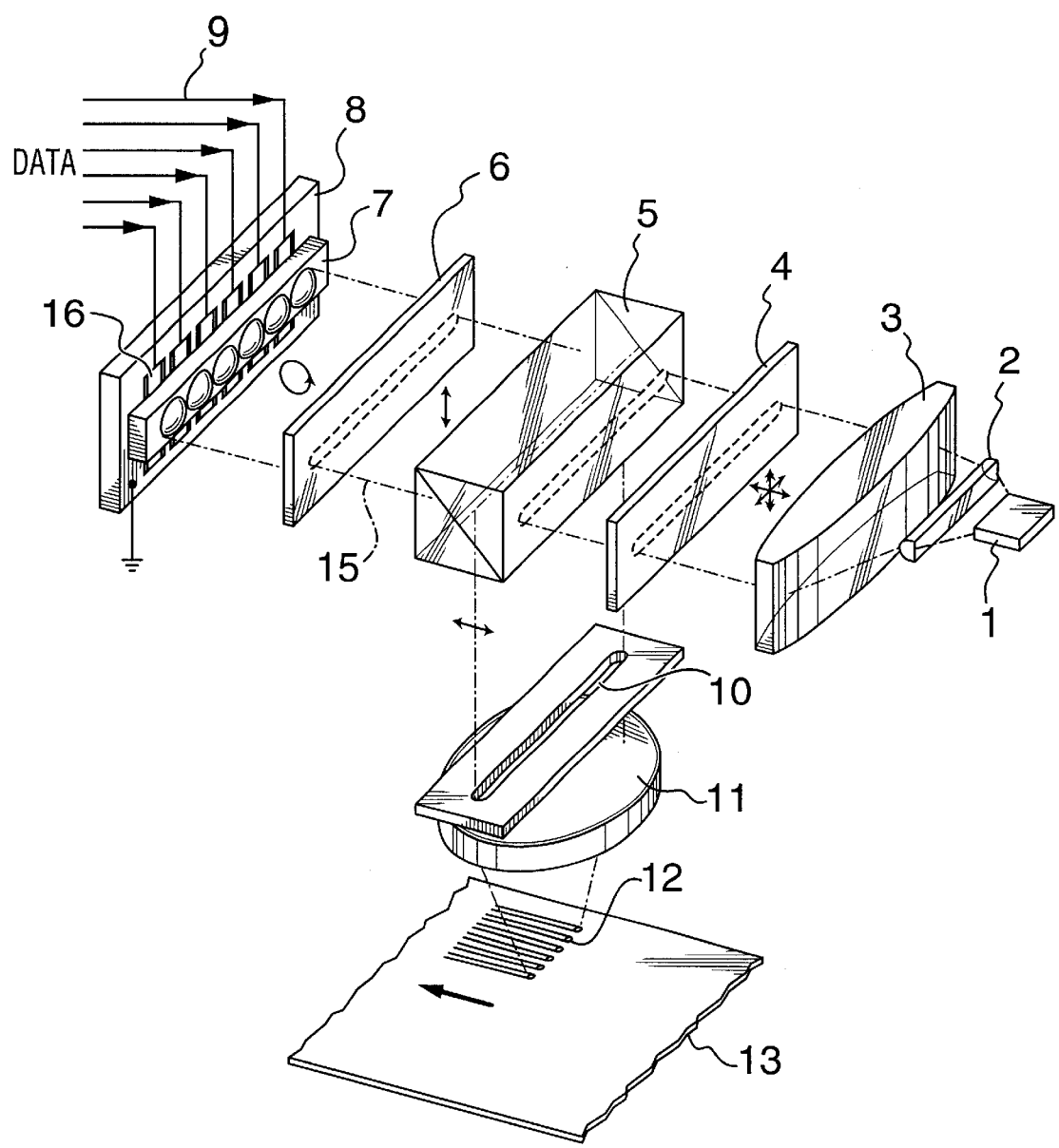
FIG. 1 depicts a preferred embodiment of the present invention. An array of light valves is used to record data onto a recording surface.

Referring to FIG. 1, laser diode 1 emits a beam 15 which is collimated in both horizontal and vertical directions by lenses 2 and 3. Lenses 2 and 3 can be spherical, cylindrical or any combination; typically, lens 2 is a strong cylindrical lens used to collimate the axis with the larger divergence and lens 3 is a weaker cylindrical lens. If the polarization of the laser is low, then an additional polarizer 4 may be introduced. The linearly polarized beam then passes through the polarizing beam splitter 5 and the quarter-wave plate 6 (where the light becomes circularly polarized) before impinging on the light valve array 8. The light valve array 8 comprises a lenslet array 7 and an array of deformable micromachined ribbons 16. Each of the ribbons 16 can be moved by electrical signals 9 such that the properties of the reflected light are changed. Upon reflection, the beam passes back through the quarter-wave plate 6, causing it to become linearly polarized again, but on an axis 90 degrees from the incident beam polarization. Thus, when the reflected light returns to the polarizing beam splitter 5, it is reflected rather than transmitted. The reflected beam then passes through slit 10 into imaging lens 11 which focuses the light in order to form an image 12 of the data 9 on recording surface 13.

Figure 2:
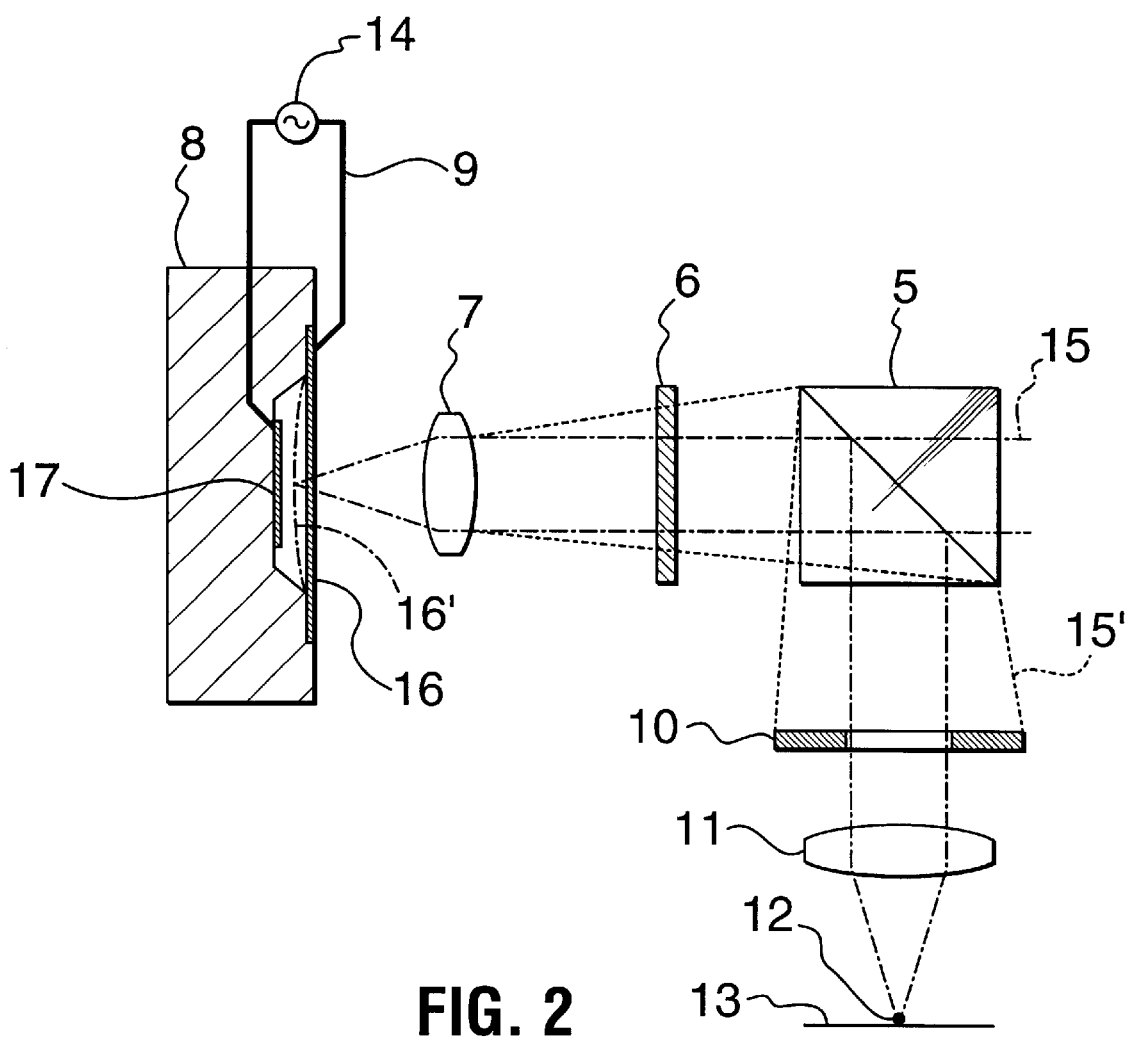
FIG. 2 shows a schematic diagram of an individual light valve.

Referring now to FIG. 2, an individual light valve is depicted. Incident collimated beam 15 travels through the polarizing beam splitter 5, the quarter-wave plate 6 and the lenslet 7. The incident light 15 will only be retro-reflected (i.e. reflected as a collimated beam) when the reflective surface of ribbon 16 is placed at the focal point of lenslet 7. Since the ribbon 16 is electrically moveable, the distance between the reflective surface and lenslet 7 can be adjusted by changing the electrical signal 14 applied between the ribbon 16 and a fixed electrode 17. Retro-reflection is achieved at position 16', where the incident light 15 is focused perfectly on the reflective surface. While this example used a collimated beam, any type and shape of beam can be used as long as this shape is changed by the motion of mirror 16, and this change in shape can be used to change the beam intensity.

The exact shape of the ribbon 16 is of relatively little importance, since only a small point on the ribbon 16 is illuminated when it is deformed to position 16' (i.e. at the focal point of lenslet 7). When retro-reflected in this manner, the reflected beam 15 has relatively little divergence, allowing it to pass easily through slit 10 after being reflected by the polarizing beam splitter 5. The reason beam 15 is reflected on the return and not on the incoming path is that its polarization was changed by passing twice through quarter-waveplate 6. When the ribbon 16 is not in position 16', the reflected beam 15 does not stay collimated and diverges rapidly, becoming the wide beam 15'. Because of this divergence, most of the reflected beam 15' is blocked by slit 10 and only a relatively small percentage of the light makes it to recording surface 13. The arrangement of prism 5, waveplate 6, lens 7 and reflective surface 16, is well known in optics and is sometimes referred to as an optical isolator, since it also prevents the reflected light from going back into the laser. While this example uses a slit to convert change in collimation (or convergence) into intensity change, there are many other well known methods for achieving this conversion. One of the best known is Schlieren imaging, in which all light reflected from one state of the mirrors is blocked by an opaque object, while any change in collimation allows the light to by-pass the opaque object.

Figure 3:
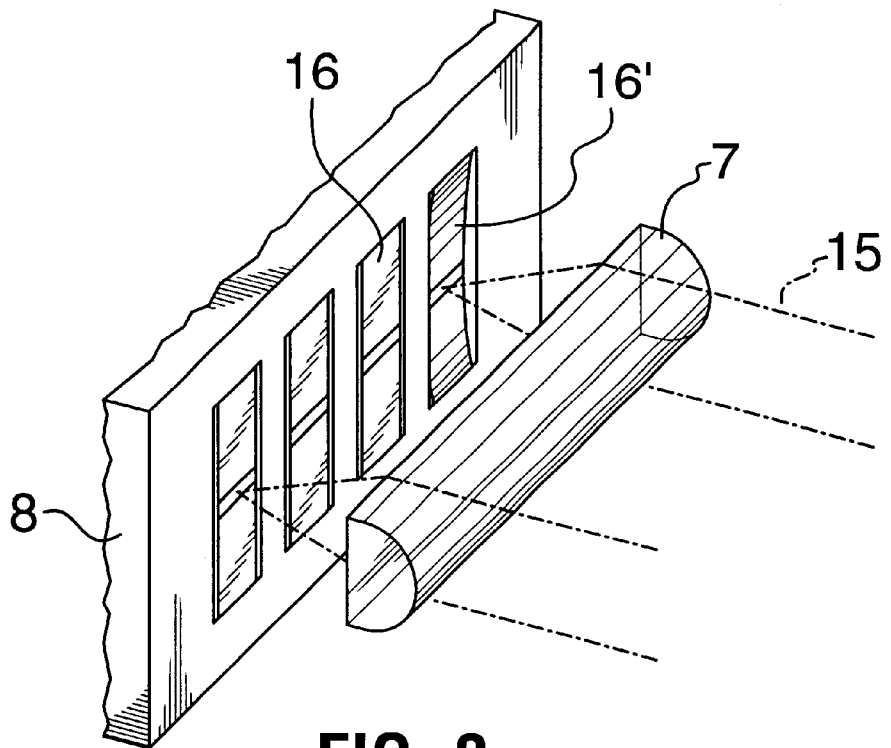
FIG. 3 depicts an implementation of the light valve array using a single cylindrical lens.
Figure 4:
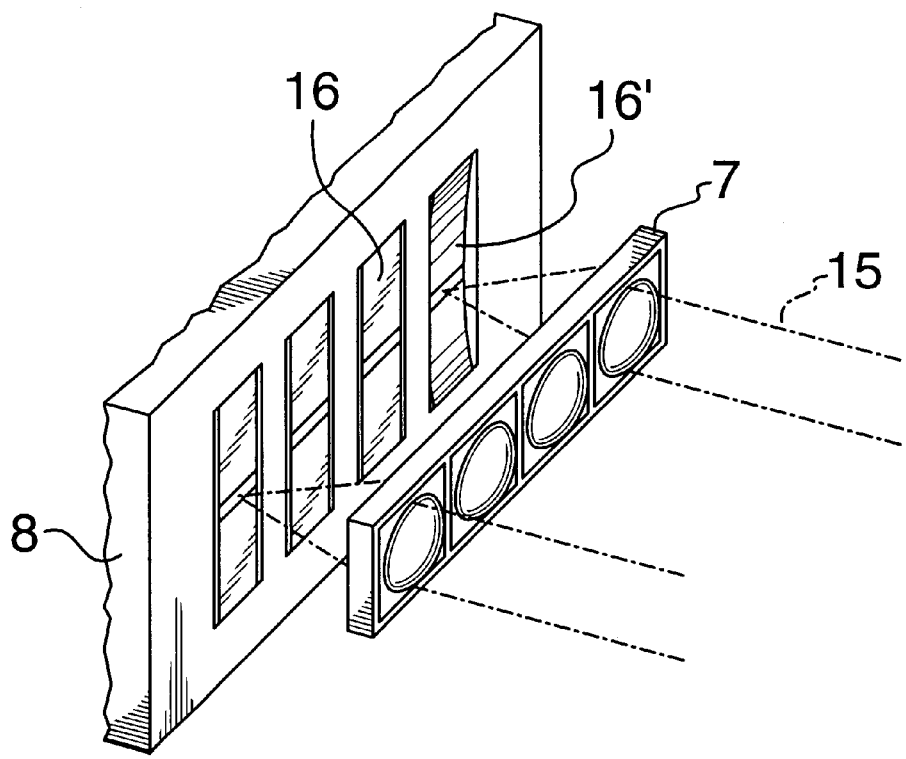
FIG. 4 depicts an implementation of the light valve array employing an array of lenslets with each lenslet corresponding to one light valve.

FIGS. 3 and 4 depict different implementations of the lens 7. FIG. 3 depicts a configuration with a single cylindrical lens 7 which directs light towards the light valve 8, whereas FIG. 4 depicts an implementation with an array of aspherical lenslets 7, each of which corresponds to one of the ribbons 16. It should be understood that throughout this disclosure, the principal lens 7 of the light valve may be either a single lens of an array of lenslets and any discussion of one or the other is meant to apply to both implementations. It is important to note that while each ribbon 16 modulates an individual spot 12 on the recording medium 13, all sub-beams forming these spots are part of a single beam passing through a single output lens 11.

The present invention has several advantages over the invention of the related application Ser. No. 09/072,753 For reasons discussed below, the present invention performs best when lens 7 has a high numerical aperture (NA). The present invention is relatively insensitive to imperfections in the reflective surface of ribbon 16, particularly when a high NA lens 7 is used. Even if there are minor imperfections in the ribbon surface, the reflected light may still be collected by lens 7 and directed onto the recording surface 13. Furthermore, the present invention focuses the light on the ribbon 16, thereby using only a small portion of its reflective surface. As such, the present invention is relatively insensitive to the shape of the deformed ribbon 16.

Figure 5A:
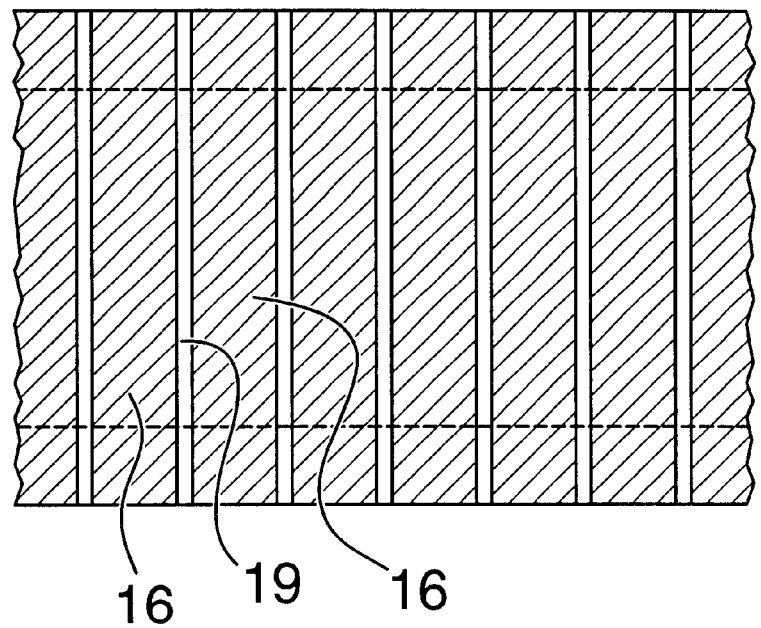
FIG. 5a shows a prior art ribbon assembly.
Figure 5B:
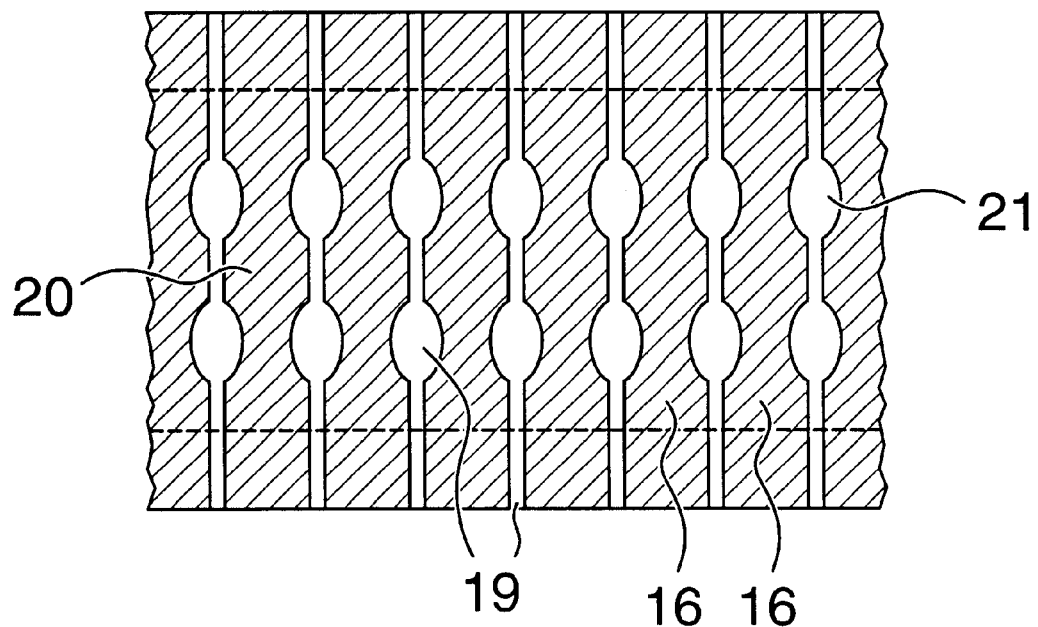
FIG. 5b shows a ribbon assembly having shaped ribbons according to a preferred embodiment of the invention.

Referring now to FIGS. 5a 5b, an additional advantage involves the shape of the ribbons 16. As discussed above, micromaching processes require small gaps 19 between each ribbon 16 in order to etch the cavity (not shown) behind the ribbons 16. These gaps 19 are shown in the prior art ribbon array of FIG. 5a. In the prior art invention, these gaps 19 represent a source of optical inefficiency, because no light is reflected from them. In the preferred embodiment of the present invention (FIG. 5b), the ribbons 16 can be shaped so as to minimize the gaps 19 in the reflection zones 20 and maximize the gaps 19 in the non-reflecting zones 21. In this manner, the fabrication process is made easier, because larger gaps 19 are available, yet high optical efficiency is maintained.

Referring back to FIG. 1, the preferred embodiment employs a lenslet array 7, wherein each individual lenslet has a high numerical aperture (NA). High NA lenses are preferable for a number of reasons. As mentioned previously, a high NA lens is less sensitive to minor imperfections in the reflective surface of the ribbon 16. In addition, the depth of focus of an optical system is proportional to $1/(NA)^2$. Thus, the focusing properties of an optical system with a high NA lens will vary more substantially when the position of the reflective ribbon 16 is changed.

The preferred embodiment also employs a lenslet array 7 with a relatively small focal length. A small focal length is preferable because it makes the physical dimensions of the light valve as small as possible, a significant advantage because each array may have from hundreds to thousands of ribbons.

For high power laser sources, an additional advantage is provided by merely changing the system focus without actually focusing the beam on the ribbon. Such a process requires the ribbons to change from an out of focus state (at no deformation) to a different focus state (after deformation), the second focus state being not exactly perfect focus. This design feature would prevent the high power laser source from destroying the structural or reflective surface-properties of the ribbons by excessive power density, while maintaining a relatively collimated reflected beam. An additional collimating lens may be added in the path of the reflected beam to achieve better collimation.

EXAMPLE

The preferred embodiment was tested in a system wherein the light valve ribbons were 40 microns wide by 300 microns long on a 50 micron pitch (i.e. the gaps between ribbons were approximately 10 microns). The ribbons were made of 2000 Å thick silicon nitride covered with 500 Å of gold on top of 250 Å of chrome. The airgap was about 1 micron. The lenslet array was a commercial product made of silica with square lenslets having focal lengths of 100 microns and a 50 micron pitch. One supplier of such arrays is Mems Optical Inc. (Huntsville, Ala.). The system response time (to go from 0% to 90% deflection) was measured at about 10 µs for a drive voltage of 30 V. The contrast ratio was about 10:1.

It should be understood that the above description is intended for illustrative purposes only, and is not intended to limit the scope of the present invention in any way. Those skilled in the art will appreciate that various modifications can be made to the embodiments discussed above without departing from the spirit of the present invention.

What is claimed is:

1. A light valve comprising:
   (a) an array of independently movable mirrors each comprising a micro-machined ribbon supported over a cavity in a substrate and having a reflective surface;
   (b) a cylindrical lens mounted in proximity to and extending along said array of movable mirrors;
   (c) an incoming light beam passing through said cylindrical lens and being reflected by said ribbons, reflected light passing through said lens;
   (d) means for selectively deforming said ribbons in order to cause changes in the collimation of the light reflected from each one of said ribbons independent of other ones of the ribbons; and,
   (e) means for converting said changes in collimation into changes of light intensity in order to generate an array of light spots, the intensity of each of said spots capable of being changed independently of other spots.

2. A light valve comprising:
   (a) a source of incident light;
   (b) a micro-machined ribbon supported at both ends over a cavity, said ribbon having a reflective region operative to reflect said incident light such that said incident light becomes reflected light;
   (c) at least one lens placed in proximity to said ribbon, said incident light passing through said lens and being focused by said lens at a focal point said ribbon being selectively deformable in such a manner that, upon deformation, said reflective region is translated in space relative to the focal point from a first position spaced apart from the focal point to a second position wherein the focal point is substantially coincident with the reflective region so as to vary the collimation of the reflected light which has passed through said lens; and,
   (d) an optical subsystem operative to receive said reflected light which has passed through said lens and convert said variation in collimation of said reflected light into a variation in light intensity.

3. A light valve according to claim 2, wherein said source of incident light comprises a laser source.

4. A light valve according to claim 2, wherein said ribbon comprises a non-metallic material and said reflective region is formed by the addition of a metallic coating to said non-metallic material.

5. A light valve according to claim 4, wherein said non-metallic material is silicon nitride and said ribbon, said reflective region and said cavity are formed by a micromachining process.

6. A light valve according to claim 2, wherein said selective deformation of said ribbon is effected by application of an electrical signal.

7. A light valve according to claim 6, wherein said electrical signal is operative to create an electrostatic field in the vicinity of said ribbon, said electrostatic field exerting a force which causes said selective deformation of said ribbon.

8. A light valve according to claim 2, wherein said optical subsystem comprises a slit located to receive said reflected light from said lens and to transmit said reflected light if it has been substantially collimated by said lens and to block a substantial fraction of said reflected light if it is uncollimated.

9. A light valve according to claim 2, wherein said optical sub system comprises at least one opaque area, said reflected light being blocked by said opaque area in one state of collimation and avoiding said opaque area in a second state of collimation.

10. A light valve according to claim 2, wherein said incident light source further comprises:
    (a) a polarizing beam splitter operative to receive incident light from said source light and to transmit only incident light of a particular incident linear polarization;
    (b) a quarter wave plate operative to convert said light of said particular incident linear polarization to substantially circularly polarized incident light and to direct said circularly polarized incident light toward said lens, said quarter wave plate also operative to receive said reflected light from said lens and to convert said reflected light from circular polarization to light of a particular reflected linear polarization, said particular reflected linear polarization being orthogonal to said particular incident linear polarization; and,
    (c) said polarizing beam splitter also operative to reflect said light of a particular reflected linear polarization toward means of converting said variation in the collimation of the reflected light into variations of light intensity.

11. A light valve as in claim 2 wherein said optical subsystem comprises a combination of opaque and clear areas, light being blocked by said opaque area in one state of collimation and substantially avoiding said opaque area when collimation is changed.

12. A light valve according to claim 2, wherein said lens comprises a lenslet in an array of lenslets.

13. A light valve according to claim 2 wherein said lens comprises a cylindrical lens.

14. A light valve as claimed in claim 2 further comprising a plurality of said ribbons, wherein said ribbons are spaced apart from adjacent ribbons by a gap and each ribbon has a wider central reflection zone and is narrower at ends of the ribbon.

15. A deformable mirror light valve comprising:
    (a) a source of incident light;
    (b) an optical subsystem operative to transmit said incident light and to cause said incident light to converge at least in one axis as an incident beam;
    (c) an array of micro-machined ribbons, each individual ribbon being supported over a single cavity and having a corresponding reflective region thereon, and each ribbon intercepting a portion of said incident beam, thus dividing said beam into sub-beams, each of said reflective regions operative to:
  (i) receive a corresponding portion of said incident light beam, which has been caused to converge by said optical subsystem; and
  (ii) reflect said corresponding portion of said incident light beam in a manner that each reflected portion of said incident light beam becomes a corresponding sub-beam of reflected light and passes through at least part of said optical subsystem;
each of said ribbons being selectively deformable such that, upon deformation, said corresponding reflective region is translated in space so as to vary the amount by which a single corresponding one of the sub-beams of reflected light converges after passing through said optical subsystem;
  (d) means for converting said changes in the convergence of the reflected sub-beams into corresponding changes in light intensity.

16. A light valve according to claim 15, wherein said source of incident light is a laser source.

17. A light valve according to claim 5, wherein each of said ribbons comprises a non-metallic material and each of said reflective regions is formed by the addition of a metallic coating to said non-metallic material.

18. A light valve according to claim 7, wherein said non-metallic material is silicon nitride and said ribbons, said reflective regions and said cavity are formed by a micromachining process.

19. A light valve according to claim 5, wherein said selective deformation of each of said ribbons is effected by application of a corresponding electrical signal.

20. A light valve according to claim 19, wherein said corresponding electrical signal is operative to create a localized electrostatic field in the vicinity of an individual ribbon, said electrostatic field exerting a force which causes said selective deformation of said ribbon.

21. The light valve of claim 15 wherein the means for converting changes in the convergence of the reflected sub-beams into corresponding changes in light intensity comprises a slit located to receive the sub-beams from the optical subsystem wherein sub-beams having a convergence greater than a threshold value can pass through the slit substantially unattenuated whereas sub beams having a convergence less than the threshold are attenuated at the slit.

22. A method of digital modulation of laser light, which comprises the steps of:
  (a) directing an incident laser beam through a lens causing said incident laser beam to converge;
  (b) reflecting said incident converging laser beam using a reflective surface such that said incident laser beam becomes a reflected laser beam and passing said reflected beam through said lens;
  (c) translating said reflective surface in space in accordance with digital data, so as to cause a corresponding variation in the degree of collimation of said reflected beam;
  (d) converting said variation in collimation to variations in light intensity by passing said reflected beam through a slit located on a side of said lens away from said reflective surface.

23. A light valve comprising:
  a beamsplitter and a lens, arranged so that incident light from a light source passes through the beamsplitter and is focused by the lens onto a focal region;
  a deformable micro-machined ribbon supported over a cavity in a substrate in the vicinity of the focal region, the ribbon having first and second positions selectable by the application of an electrical control signal;
  a reflective surface on the ribbon; and,
  a slit located in an optical path between the beamsplitter and a recording surface;
  wherein, when the ribbon is in the first position the reflective surface coincides substantially with the focal region and a beam of light reflected by the reflective surface passes through the slit and when the ribbon is in the second position a beam of light reflected by the reflective surface diverges before reaching the slit and most of the beam of light reflected by the reflective surface does not pass through the slit.

24. The light valve of claim 23 comprising a linear array of said ribbons arranged in parallel, each spaced apart from adjacent ribbons by a gap.

25. The light valve of claim 24 wherein each of the ribbons has a wider central reflection zone and is narrower at ends of the ribbon and the gaps are wider in their portions adjacent ends of the ribbons than are the gaps in their portions adjacent the central reflection zones of the ribbons.

26. The light valve of claim 24 wherein the lens comprises a cylindrical lens extending generally perpendicularly to the ribbons.

27. The light valve of claim 24 wherein the lens comprises an array of lenslets, with one of the lenslets focusing light onto each of the ribbons.

* * * * *